United States Patent
Thoen

(10) Patent No.: US 10,057,672 B2
(45) Date of Patent: Aug. 21, 2018

(54) OPTICAL COMMUNICATION INTERFACE

(71) Applicant: NXP B.V., Eindhoven (NL)

(72) Inventor: Steven Mark Thoen, Leuven (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/285,243

(22) Filed: Oct. 4, 2016

(65) Prior Publication Data

US 2018/0098144 A1    Apr. 5, 2018

(51) Int. Cl.
H04R 1/10 (2006.01)
H04B 10/40 (2013.01)
H04B 10/114 (2013.01)
H04B 10/116 (2013.01)

(52) U.S. Cl.
CPC ......... H04R 1/1016 (2013.01); H04B 10/116 (2013.01); H04B 10/1143 (2013.01); H04B 10/40 (2013.01); H04R 1/1025 (2013.01); H04R 2420/07 (2013.01)

(58) Field of Classification Search
CPC ...... H04R 1/1016; H04R 1/1041; H04R 3/00; H04B 1/40; H04B 10/112; H05K 1/147
USPC ........... 340/944; 345/168, 104; 381/74, 107, 381/309, 311, 380, 381; 434/236; 455/418, 550.1; 600/328; 704/260, 275; 367/2; 370/311; 385/4; 398/3, 91, 128; 713/172
See application file for complete search history.

(56) References Cited

U.S. PATENT DOCUMENTS

| | | | | |
|---|---|---|---|---|
| 4,267,590 A | * | 5/1981 | Bosotti | H04B 10/2503 398/154 |
| 4,727,601 A | * | 2/1988 | Konishi | H04L 12/42 385/42 |
| 5,887,063 A | * | 3/1999 | Varadharajan | H04L 63/0492 713/172 |
| 6,477,391 B1 | * | 11/2002 | Muramatsu | H04B 1/3877 398/139 |
| 7,369,775 B2 | | 5/2008 | Nikiforov et al. | |
| 7,848,405 B2 | * | 12/2010 | Higure | H04L 25/0307 375/230 |
| 8,139,943 B2 | * | 3/2012 | Asukai | H04B 10/1143 398/118 |
| 8,577,190 B2 | | 11/2013 | Siew et al. | |

(Continued)

FOREIGN PATENT DOCUMENTS

WO    WO-2008/085866 A1    7/2008

OTHER PUBLICATIONS

AirFuel Alliance; "Charging is changing—about"; Retrieved from the Internet http://www.airfuel.org/; 2 pages (Sep. 13, 2016).

(Continued)

*Primary Examiner* — Gerald Gauthier

(57) ABSTRACT

One example discloses an optical communication interface for a handheld device: wherein the handheld device, has an external surface; wherein the external surface includes an interior facing side and an exterior facing side; a first optical receiver, on the interior facing side of the handheld device, having an optical input and an electrical output; wherein the electrical output is coupled to circuitry; and wherein the optical input is configured to be optically coupled to a second optical transmitter on the exterior facing side of the handheld device.

17 Claims, 3 Drawing Sheets

(56) References Cited

U.S. PATENT DOCUMENTS

| | | | | |
|---|---|---|---|---|
| 8,600,236 | B2* | 12/2013 | Shin | G02B 6/4215 |
| | | | | 398/135 |
| 9,020,352 | B2* | 4/2015 | Shin | G02B 6/29365 |
| | | | | 398/164 |
| 9,210,493 | B2* | 12/2015 | Swanson | H04R 1/1016 |
| 9,438,300 | B1* | 9/2016 | Oliaei | H04W 72/04 |
| 9,525,936 | B1* | 12/2016 | Dong | H04R 3/00 |
| 9,584,074 | B2* | 2/2017 | Chiappetta | H03F 3/082 |
| 9,654,225 | B2* | 5/2017 | Rylyakov | H04B 10/58 |
| 9,794,002 | B1* | 10/2017 | Prendergast | H04L 25/026 |
| 9,823,361 | B2* | 11/2017 | Niwa | H04N 5/32 |
| 9,866,321 | B2* | 1/2018 | Oh | H04B 10/114 |
| 9,921,794 | B2* | 3/2018 | Lee | G06F 3/1446 |
| 9,941,976 | B2* | 4/2018 | Rylyakov | H04B 10/6971 |
| 9,941,990 | B2* | 4/2018 | Baehr-Jones | H04J 14/02 |
| 2003/0117374 | A1* | 6/2003 | McCloud | G06F 1/1626 |
| | | | | 345/168 |
| 2006/0094936 | A1* | 5/2006 | Russ | H04M 1/725 |
| | | | | 600/300 |
| 2006/0256070 | A1* | 11/2006 | Moosavi | H04B 10/1141 |
| | | | | 345/104 |
| 2009/0154739 | A1* | 6/2009 | Zellner | H04R 1/1041 |
| | | | | 381/311 |
| 2011/0054907 | A1* | 3/2011 | Chipchase | H04M 1/6066 |
| | | | | 704/275 |
| 2011/0110534 | A1* | 5/2011 | Lindahl | G06F 3/0482 |
| | | | | 381/107 |
| 2011/0161085 | A1* | 6/2011 | Boda | G06Q 30/02 |
| | | | | 704/260 |
| 2014/0016796 | A1* | 1/2014 | Maust | H04R 1/1041 |
| | | | | 381/74 |
| 2014/0029494 | A1* | 1/2014 | Sundaram | H04W 52/0235 |
| | | | | 370/311 |
| 2014/0160880 | A1* | 6/2014 | King | H04B 11/00 |
| | | | | 367/2 |
| 2014/0219467 | A1* | 8/2014 | Kurtz | H04R 3/12 |
| | | | | 381/74 |
| 2015/0010308 | A1 | 1/2015 | Uedaira et al. | |
| 2015/0141752 | A1* | 5/2015 | Wilson | A61B 1/00013 |
| | | | | 600/109 |
| 2015/0148636 | A1* | 5/2015 | Benaron | A61B 5/0059 |
| | | | | 600/328 |
| 2015/0207912 | A1* | 7/2015 | Gulliksson | H04M 1/7253 |
| | | | | 455/418 |
| 2016/0050479 | A1* | 2/2016 | Anderson | H04R 1/1025 |
| | | | | 381/74 |
| 2016/0093207 | A1* | 3/2016 | Di Censo | H04R 1/1091 |
| | | | | 340/944 |
| 2016/0142156 | A1* | 5/2016 | Hwang | H04B 10/803 |
| | | | | 398/128 |
| 2016/0182991 | A1* | 6/2016 | Zakzeski | H04R 1/1091 |
| | | | | 381/381 |
| 2016/0196758 | A1* | 7/2016 | Causevic | G09B 5/00 |
| | | | | 434/236 |
| 2016/0205475 | A1* | 7/2016 | Shanmugam | H04R 5/033 |
| | | | | 381/309 |
| 2016/0329961 | A1* | 11/2016 | Li | H04B 10/1125 |
| 2017/0064830 | A1* | 3/2017 | Jiang | H05K 1/147 |
| 2017/0094399 | A1* | 3/2017 | Chandramohan | A45C 13/02 |
| 2017/0208382 | A1* | 7/2017 | Grinker | G10K 11/1782 |

OTHER PUBLICATIONS

AspenCore, Inc.; "Octocoupler Tutorial"; retrieved from the Internet http://www.electronics-tutorials.ws/blog/optocoupler.html; 9 pages (Sep. 13, 2016).

Bragi; "Technical Specifications"; retrieved from the Internet www.bragi.com/thedash/#techSpecs; 13 pages (Sep. 13, 2016).

Hunn, Nick; "The Market for Smart Wearable Technology—A Consumer Centric Approach"; retrieved from the Internet http://www.nickhunn.com/wp-content/uploads/downloads/2015/07/The-Market-for-Smart-Wearables-Feb-2015-3rd-Edition-rev2.pdf; 63 pages (Feb. 2015).

Qi Wireless; "General Archives" retrieved from the Internet http://www.qiwireless.com/category/general/ ; 22 pages (Sep. 13, 2016).

Transfer Jet; "What is Transfer Jet—Overview?"; retrieved from the Internet http://www.transferjet.org/tj/tj_overview.html; 2 pages (Sep. 13, 2016).

FaulwaBer, Michael et al., "10 Gbit/s Bidirectional Optical Wireless Communication Module for Docking Devices", Globecom 2014 Workshop—Optical Wireless Communications, 6 pages (Dec. 8, 2014).

Yazaki, Tomonori et al., "Demonstration of Optical Wireless USB 2.0 System with Wireless Power Transfer", 2011 IEEE International Conference on Consumer Electronics (ICCE), IEEE, Piscataway, NJ, USA , pp. 11-12, (Jan. 9, 2011).

* cited by examiner

OPTICAL COMMUNICATION INTERFACE

The present specification relates to systems, methods, apparatuses, devices, articles of manufacture and instructions for an optical communications interface.

SUMMARY

According to an example embodiment, an optical communication interface for a handheld device: wherein the handheld device, has an external surface; wherein the external surface includes an interior facing side and an exterior facing side; a first optical receiver, on the interior facing side of the handheld device, having an optical input and an electrical output; wherein the electrical output is coupled to circuitry; and wherein the optical input is configured to be optically coupled to a second optical transmitter on the exterior facing side of the handheld device.

In another example embodiment, further comprising, a first optical transmitter, on the interior facing side of the handheld device, and having an electrical input and an optical output; wherein the electrical input is coupled to the circuitry; and wherein the optical output is configured to be coupled to a second optical receiver on the exterior facing side of the handheld device.

In another example embodiment, the second optical receiver and the second optical transmitter are coupled within an external surface of a second device.

In another example embodiment, the first optical receiver is configured to be separated from the second optical transmitter by an air gap less than one meter.

In another example embodiment, the handheld device is at least one of: a mobile device, a medical device, a wearable device, a hearable, an earbud, or a smartphone.

In another example embodiment, the second device is at least one of: a docking device, a base-station, a charging case, a smartphone, a computer, or a display screen surface.

In another example embodiment, the optical transmitter in the second device is a display screen.

In another example embodiment, the optical transmitter is at least one of: a photodiode, or an LED diode; and the optical receiver is at least one of: a phototransistor, a photoconductor, or a light sensor.

In another example embodiment, the handheld device includes multiple sets of optical transmitters and receivers distributed at various spatial locations on the handheld device configured to flexibly connect with the second device.

In another example embodiment, the handheld device and second device include alignment elements configured to increase a signal-to-noise ratio between at least one optical transmitter and receiver pair.

In another example embodiment, the first optical transmitter and first optical receiver are configured to exchange data with the second device using optical wavelengths; and data exchanged includes at least one of: firmware updates; software update; file transfers; configuration or user profile set-up or reconfiguration (e.g. voice command language profiles); media storage (e.g. playlists); and application (App) program updates.

In another example embodiment, the optical transmitter or the optical receiver on the handheld device are also used for at least one of: health monitoring or visual display.

In another example embodiment, the external surface includes an optical window configured to enable the optical coupling with the second optical transmitter.

In another example embodiment, the optical window is transparent or translucent over a set of optical frequencies which either the first optical receiver or first optical transmitter are configured to operate; and the optical window includes at least one of: transparent plastic, glass, quartz, or any material that is optically transparent to the frequencies being used.

In another example embodiment, further comprising an encapsulation covering the exterior facing side of the handheld device.

In another example embodiment, the encapsulation forms at least one of: a water-resistant seal, a water-tight seal, a dust-resistant seal, or a hermetic seal.

In another example embodiment, the encapsulation is configured to enable the optical coupling with the second optical transmitter.

According to an example embodiment, an optical communication interface for a handheld device: wherein the handheld device, has an external surface; wherein the external surface includes an interior facing side and an exterior facing side; a first optical transmitter, on the interior facing side of the handheld device, and having an electrical input and an optical output; wherein the electrical output is coupled to circuitry; and wherein the optical output is configured to be coupled to an optical receiver on the exterior facing side of the handheld device.

According to an example embodiment, an optical communication interface for a contactless earbud: wherein the contactless earbud, has an external surface; wherein the external surface includes an interior facing side and an exterior facing side; a first optical receiver, on the interior facing side of the contactless earbud, having an optical input and an electrical output; herein the electrical output is coupled to circuitry; wherein the optical input is configured to be optically coupled to a second optical transmitter on the exterior facing side of the contactless earbud; a first optical transmitter, on the interior facing side of the contactless earbud, and having an electrical input and an optical output; wherein the electrical input is coupled to the circuitry; wherein the optical output is configured to be coupled to a second optical receiver on the exterior facing side of the contactless earbud.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

Figure 1:
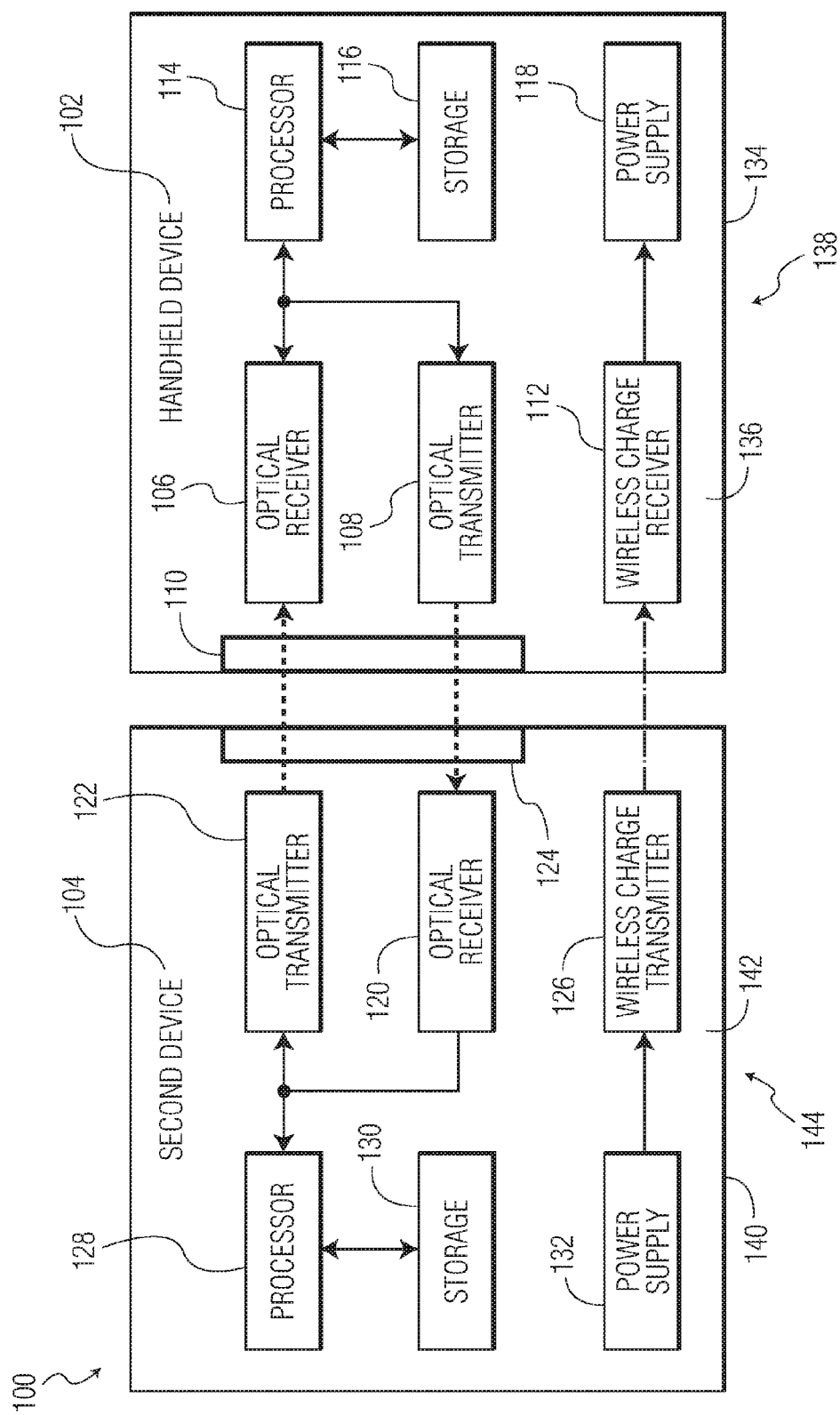
FIG. 1 is a first example of an optical communication interface.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alter-

DETAILED DESCRIPTION

Handhe11d devices come in many forms such as: a smartphone, a wearable device, a hearable, an earbud, mobile devices and various medical devices. Handheld devices are herein defined to include devices that can be readily carried by an average person. Such handheld devices are not necessarily continually held in a person's hand, but in many example embodiments are at some point carried in a person's hand, such as when affixing to a piece of clothing, a fixture, or a person's body.

Handheld devices, such as hearables for example, can consist of two wireless earbuds with embedded audio and sensor capabilities. In terms of audio capabilities, they can support in most cases playback of stereo audio from an external device such as a cellphone and making phone calls. They can communicate with the cellphone through Bluetooth Classic or through Bluetooth Low Energy (BLE).

Some handheld devices may use a USB cable for charging their internal batteries and for data transfer. Such data-transfer may include: embedded firmware upgrades, updating of the embedded voice prompts (e.g. when the user selects a new language) and/or updating an embedded media (e.g. MP3) database.

However, since other handheld devices (e.g. hearables, earbuds, etc.) are space-constrained, there is little to no room for a standard USB connector. One example approach is to construct a custom USB port/connector on the handheld device's docking station, which also includes a standard USB port.

In one example, such a custom USB connector may include individual galvanic contacts with pogo-pins. Such custom USB connectors could transport both power and data in a manner similar to a standard USB port and cable.

Example custom USB connectors however may have various problems. For example:

the custom connector may be mechanically or electrically complicated and costly, with many mechanical design constraints;

guaranteeing signal integrity (which is crucial for USB 3.0) across the connector may be difficult, leading to reduced data transfer speeds;

the galvanic contacts may corrode or otherwise become damaged over time;

extra electronic precautions may be required to ensure that the handheld device's battery does not discharge thru the custom connector when a person is wearing the devices (e.g. through conductive sweat perhaps); and galvanic contacts may compromise the water tightness of the handheld device.

Contactless handheld devices may have problems of their own. For example, a standard/custom USB connector's high-speed data transfer capability is lost when going to some example contactless earbuds.

Some handheld devices while including one or more of following radios for wireless data communication, may not have sufficient BW available for transferring large databases in a reasonable amount of time. For example:

Bluetooth Classic:
Maximum PHY rate is 3 Mbps in EDR mode;
Actual data throughput may however be only a fraction of this;

Bluetooth Low Energy:
Maximum PHY rate today is 1 Mbps;
A new PHY mode with maximum PHY rate of 2 Mbps is being standardized;
Actual data throughput may however be only a fraction of this;

NearField Magnetic Induction radio:
Maximum PHY rate today is 0.6 Mbps;
Actual data throughput may however be only a fraction of this.

Wireless charging standards, such as Qi or A4WP, similarly only offer a very limited communication bandwidth, which is used for controlling the wireless charging behavior and not for application data transfer.

Other means for contactless data transfer, such as adding an additional radio with sufficient data throughput, such as WiFi, UWB or other, have high power consumption, increase the cost of the handheld device, take up valuable internal device real estate, and require an additional antenna. This can make integration of an additional high-speed radio into such a space-constrained device unpractical.

Discussed below is an optical means of achieving high-speed data transfer option for handheld devices, without requiring an additional transceiver or antenna.

FIG. 1 is a first example 100 of an optical communication interface. The first optical communication interface 100 includes: a handheld device 102 configured to communicate with a second device 104.

The handheld device 102 includes: an optical receiver 106, an optical transmitter 108 (optional in some embodiments), an optical window 110 (optional in some embodiments), a wireless charge receiver 112 (optional in some embodiments), a processor 114, data storage 116, a power supply 118 (e.g. battery), an external surface 134, an interior facing side 136, and an exterior facing side 138.

The second device 104 includes: an optical receiver 120 (optional in some embodiments), an optical transmitter 122, an optical window 124 (optional in some embodiments), a wireless charge transmitter 126 (optional in some embodiments), a processor 128, data storage 130, a power supply 132, an external surface 140, an interior facing side 142, and an exterior facing side 144.

The handheld device 102, has an external surface 134 having an interior facing side 136 and an exterior facing side 138. The optical receiver 106, on the interior facing side 136 of the handheld device 102, having an optical input and an electrical output. The electrical output is coupled to circuitry (e.g. processor 114, data storage 116, power supply 118, etc.).

The optical input is configured to be optically coupled ("dashed arrow") to a second optical transmitter 122 on the exterior facing side 138 of the handheld device 102. "On the exterior facing side 138" is herein defined to include the handheld device's 102 external environment, which may or may not actually be in physical contact with the handheld device 102.

The optical transmitter 108, on the interior facing side 136 of the handheld device 102, also has an electrical input and an optical output. This electrical input is also coupled to the circuitry. The optical output is configured to be coupled (opposite facing "dashed arrow") to a second optical receiver 120 on the exterior facing side 138 of the handheld device 102.

In one example, the second optical receiver 120 and the second optical transmitter 122 are coupled within the external surface 140 of the second device 104.

The first optical receiver 106 is configured to be separated from the optical transmitter 122 by an air gap, perhaps less than one meter in some example embodiments. Thus the first example optical communication interface 100 uses light for contactless communication and data transfer.

The data exchanged can include: firmware updates; software update; file transfers; configuration or user profile set-up or reconfiguration (e.g. voice command language profiles); media storage (e.g. playlists); and application (App) program updates.

In one example, both the handheld device 102 and the second device 104 each have optical receivers 106, 120 and optical transmitters 108, 122. The optical receivers 106, 120 and transmitters 108, 122 form two optical transmitter/receiver communication paths for simultaneously receiving and transmitting information.

The optical transmitters 108, 122 in different examples can be: a photodiode, or an LED diode.

Similarly, the optical receiver 106, 120 in different examples can be: a phototransistor, a photoconductor, or a light sensor.

The external surface 134 includes an optical window 110 configured to enable the optical coupling with the second optical transmitter 122. The optical window 110 is transparent or translucent over a set of optical frequencies which either the optical receiver 106 or optical transmitter 108 are configured to operate. The optical window 110 can be fabricated out of: transparent plastic, glass, quartz, or any material that is optically transparent to the frequencies being used.

In some example embodiments, an encapsulation (see 312 in FIG. 3) covers or envelops the exterior facing side 138 of the handheld device 102. The encapsulation can be selected to form: a water-resistant seal, a water-tight seal, a dust-resistant seal, or a hermetic seal. If the encapsulation covers the optical window 110, the encapsulation can also be selected to enable the optical coupling with the second optical transmitter 122.

In other example embodiments, the handheld device 102 can include multiple sets of optical transmitters 108, 122 and receivers 106, 120 distributed at various spatial locations on the handheld device 102 configured to flexibly connect with the second device 104.

In various example embodiments, the handheld device 102 can be: a mobile device, a medical device, a wearable device, a hearable, an earbud, or a smartphone.

Similarly, in various example embodiments, the second device 104 can be: a docking device, a base-station, a charging case, a smartphone, a computer, or a display screen surface.

If only one way data transfer is required, the second device 104 can be a display screen and the optical transmitter 122 is comprised of pixels on the display screen.

The optical transmitter 108 or the optical receiver 106 on the handheld device 102 can in certain example embodiments also be used for at least one of: health monitoring or visual display, provided their frequency spectrum of operation is adjusted.

In certain example embodiments, the power supply 118 (e.g. a disposable battery) in the handheld device 102 is wirelessly charged.

Figure 2:
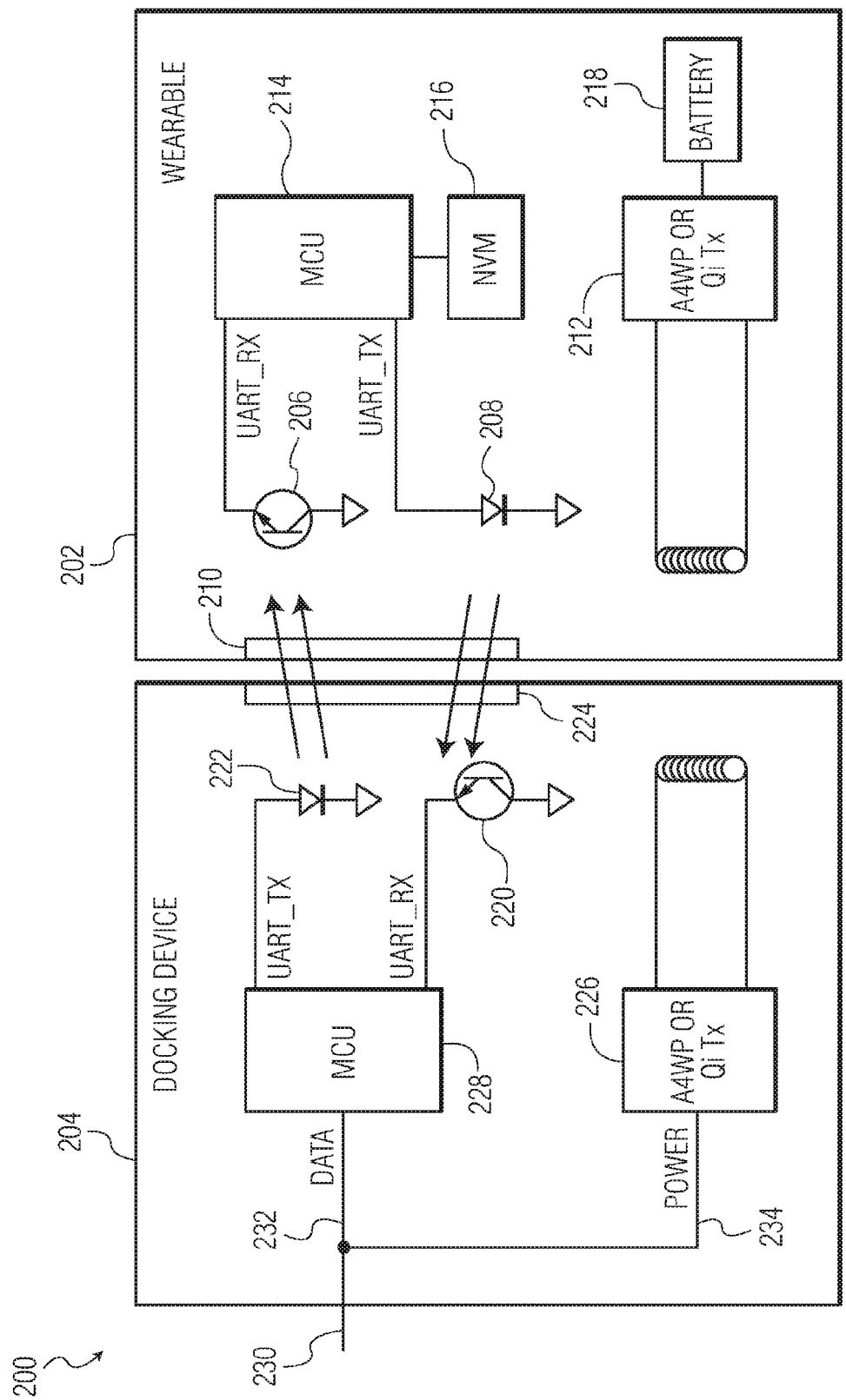
FIG. 2 is a second example of an optical communication interface.

FIG. 2 is a second example 200 of an optical communication interface. The second optical communication interface 200 includes a wearable 202 configured to communicate with a docking device 204.

The wearable 202 includes: an optical receiver 206, an optical transmitter 208, an optical window 210, a wireless charge receiver 212, a processor 214, data storage 216, and a power supply 218.

The docking device 204 includes: an optical receiver 220, an optical transmitter 222, an optical window 224, a wireless charge transmitter 226, a processor 228, a USB interface 230, data lines 232, and a power input 234.

In this second example 200, the docking device 204 (e.g. an earbud case) contains a processor 228 (e.g. microcontroller) with a High-Speed USB interface 230. This MCU 228 buffers incoming USB communication data and enables the docking device 204 to convert the USB communication data to an optical UART (Universal Asynchronous Receiving and Transmitting), which is then transmitted to the wearable 202 (e.g. a hearable earbud).

Conversely, the wearable's 202 processor 214 (e.g. MCU) is also used to receive and transmit data through the optical UART information interface. Although other communication protocols could be used for the second optical communication interface 200 (e.g. SPI), UART in some examples only requires 2 pins to establish bi-directional communications.

In certain example embodiments, the wearable 202 and docking device 204 are designed for an optimal (e.g. high signal to noise ratio) optical coupling between the wearable's 202 and the docking device's 204 optical receivers 206, 220 and optical transmitter 208, 222 by minimizing a distance (e.g. air gap) between, for example, a hearable 202 and is charging case 204.

Additionally, the wearable 202 and docking device 204 can include alignment elements configured to geometrically juxtapose each optical transmitter 208, 222 and receiver 206, 220 pair, thereby increasing their communications path signal-to-noise ratio.

The alignment elements can include: a mechanical element; a magnetic element, or an electro-mechanical positioning element.

Figure 3:
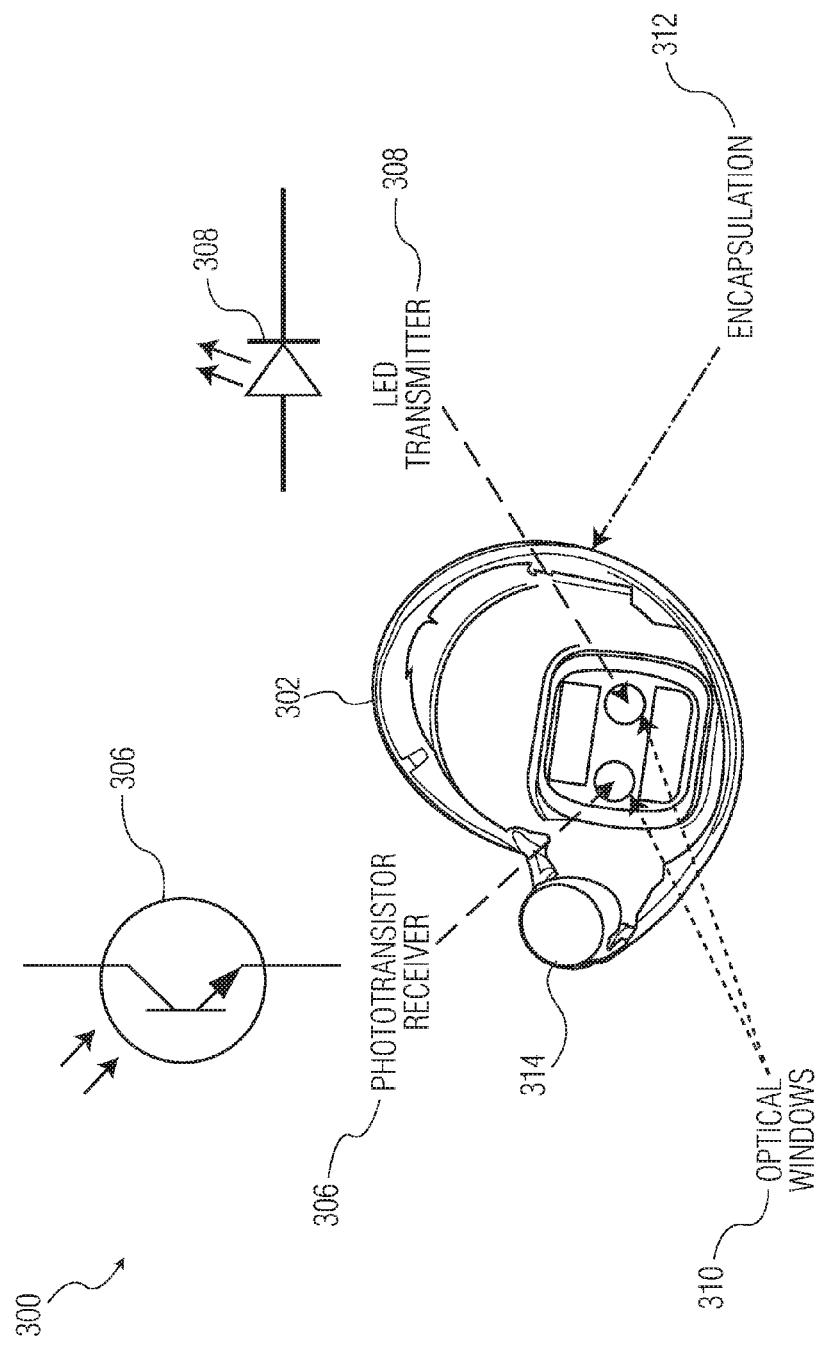
FIG. 3 is a third example of an optical communication interface.

FIG. 3 is a third example 300 of an optical communication interface. The third optical communication interface 300 is embedded in an example earbud 302.

The earbud 302 includes: an optical receiver 306, an optical transmitter 308, an optical windows 310, encapsulation 312, a speaker 314, a wireless charge receiver (not shown), a processor (not shown), data storage (not shown), and a power supply (not shown).

The third example 300 shows an example contactless hermetically sealed earbud using the encapsulation 312. Encapsulation 312 increases a lifetime of the earbud 302 and simplifies construction. The encapsulation 312 is selected to minimize interference with the optical communications paths between the earbud 302 and its docking/charging case (not shown).

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. An optical communication interface for a handheld device, wherein the handheld device has an external surface that includes an interior facing side and an exterior facing side, comprising:

a first optical receiver within a first optical window, on the interior facing side of the handheld device, having an optical input and an electrical output; wherein the electrical output is coupled to circuitry; and the optical input is configured to be optically coupled to a second optical transmitter on the exterior facing side of the handheld device; and a first optical transmitter within a second optical window next to the first optical window, on the interior facing side of the handheld device, having an electrical input and an optical output, wherein the electrical input is coupled to the circuitry and the optical output is configured to be coupled to a second optical receiver on the exterior facing side of the handheld device, and information is simultaneously received and transmitted over both optical transmitter/receiver communication paths.

2. The interface of claim 1, wherein the second optical receiver and the second optical transmitter are coupled within an external surface of a second device.

3. The interface of claim 1, wherein the first optical receiver is configured to be separated from the second optical transmitter by an air gap less than one meter.

4. The interface of claim 1, wherein the handheld device is at least one of a mobile device, a medical device, a wearable device, a hearable, an earbud, or a smartphone.

5. The interface of claim 1, wherein the second device is at least one of a docking device, a base-station, a charging case, a smartphone, a computer, or a display screen surface.

6. The interface of claim 1, wherein the optical transmitter in the second device is a display screen.

7. The interface of claim 1, wherein the optical transmitter is at least one of a photodiode, or an LED diode and the optical receiver is at least one of a phototransistor, a photoconductor, or a light sensor.

8. The interface of claim 2, wherein the handheld device includes multiple sets of optical transmitters and receivers distributed at various spatial locations on the handheld device configured to flexibly connect with the second device.

9. The interface of claim 2, wherein the handheld device and second device include alignment elements configured to increase a signal-to-noise ratio between at least one optical transmitter and receiver pair.

10. The interface of claim 2, wherein the first optical transmitter and first optical receiver are configured to exchange data with the second device using optical wavelengths and the exchanged data include at least one of firmware updates, software update, file transfers, configuration or user profile set-up or reconfiguration, media storage, and application (App) program updates.

11. The interface of claim 1, wherein the optical transmitter or the optical receiver on the handheld device are also used for at least one of health monitoring or visual display.

12. The interface of claim 1, wherein each optical window is transparent or translucent over a set of optical frequencies which either the first optical receiver or first optical transmitter are configured to operate and each optical window includes at least one of transparent plastic, glass, quartz, or any material that is optically transparent to the frequencies being used.

13. The interface of claim 1, further comprising:
an encapsulation covering the exterior facing side of the handheld device.

14. The interface of claim 13, wherein the encapsulation forms at least one of a water-resistant seal, a water-tight seal, a dust-resistant seal, or a hermetic seal.

15. The interface of claim 13, wherein the encapsulation is configured to enable the optical coupling with the second optical transmitter.

16. An optical communication interface for a handheld device, wherein the handheld device has an external surface that includes an interior facing side and an exterior facing side, comprising:
a first optical transmitter within a first optical window, on the interior facing side of the handheld device, having an electrical input and an optical output, wherein the electrical output is coupled to circuitry and the optical output is configured to be coupled to a first optical receiver on the exterior facing side of the handheld device; and a second optical transmitter within a second optical window opposite to the first optical window, on the interior facing side of the handheld device, having an electrical input and an optical output, wherein the electrical input is coupled to the circuitry and the optical output is configured to be coupled to a second optical receiver on the exterior facing side of the handheld device, and information is simultaneously received and transmitted over both optical transmitter/receiver communication paths.

17. An optical communication interface for a contactless earbud, wherein the contactless earbud has an external surface that includes an interior facing side and an exterior facing side, comprising:
a first optical receiver within a first optical window, on the interior facing side of the contactless earbud, having an optical input and an electrical output, wherein the electrical output is coupled to circuitry and the optical input is configured to be optically coupled to a second optical transmitter on the exterior facing side of the contactless earbud;

a first optical transmitter within a second optical window next to the first optical window, on the interior facing side of the contactless earbud, having an electrical input and an optical output, wherein the electrical input is coupled to the circuitry, the optical output is configured to be coupled to a second optical receiver on the exterior facing side of the contactless earbud and information is simultaneously received and transmitted over both optical transmitter/receiver communication paths.

* * * * *